May 18, 1943. R. H. ELLISON 2,319,308
APPARATUS FOR DISPENSING CARBONATED BEVERAGES
Filed May 23, 1940 3 Sheets-Sheet 1

INVENTOR.
Russell H. Ellison
BY
ATTORNEYS

May 18, 1943.  R. H. ELLISON  2,319,308
APPARATUS FOR DISPENSING CARBONATED BEVERAGES
Filed May 23, 1940  3 Sheets-Sheet 2
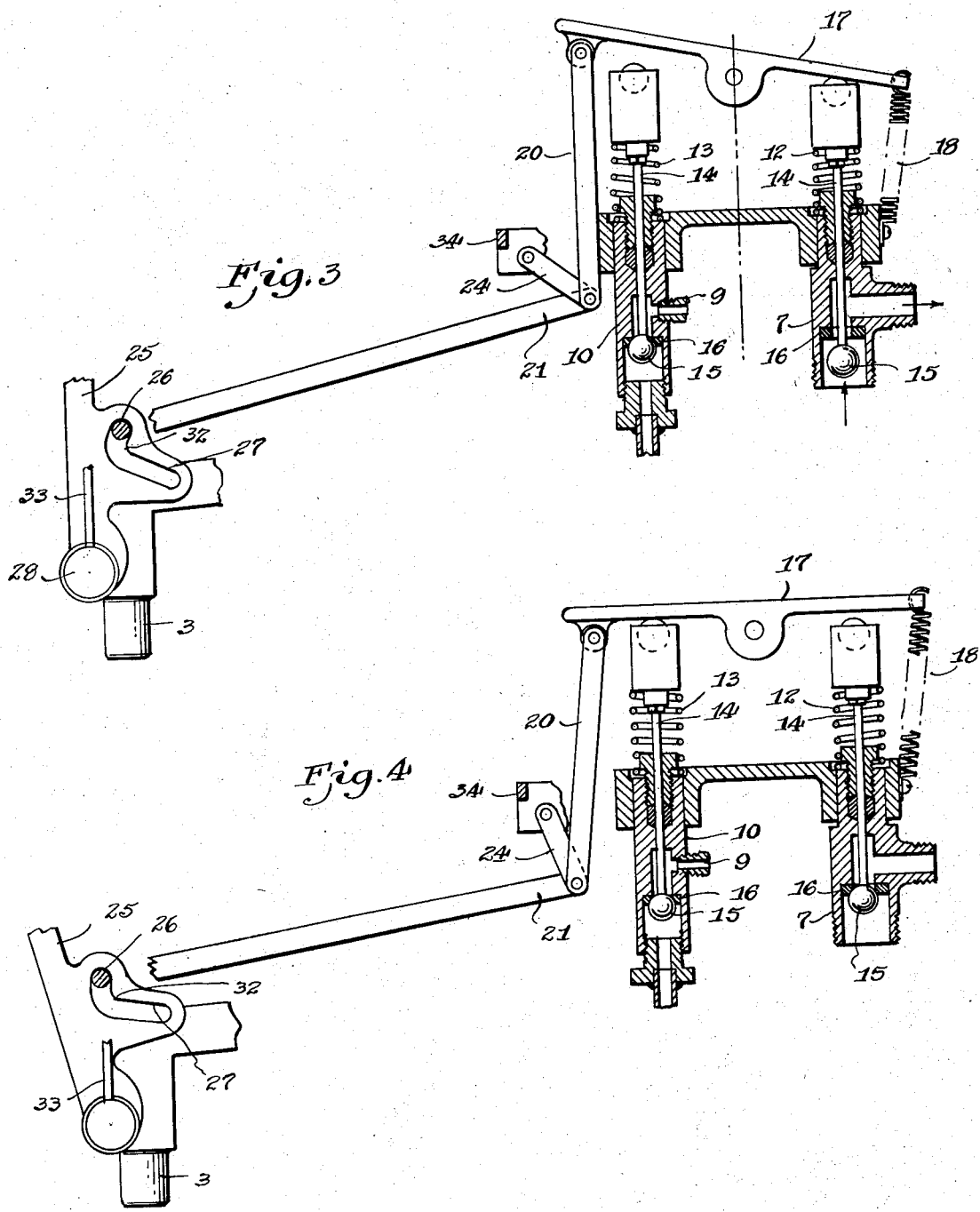
INVENTOR.
Russell H. Ellison
BY Barnes, Kisselle, Laughlin & Raisch
ATTORNEYS

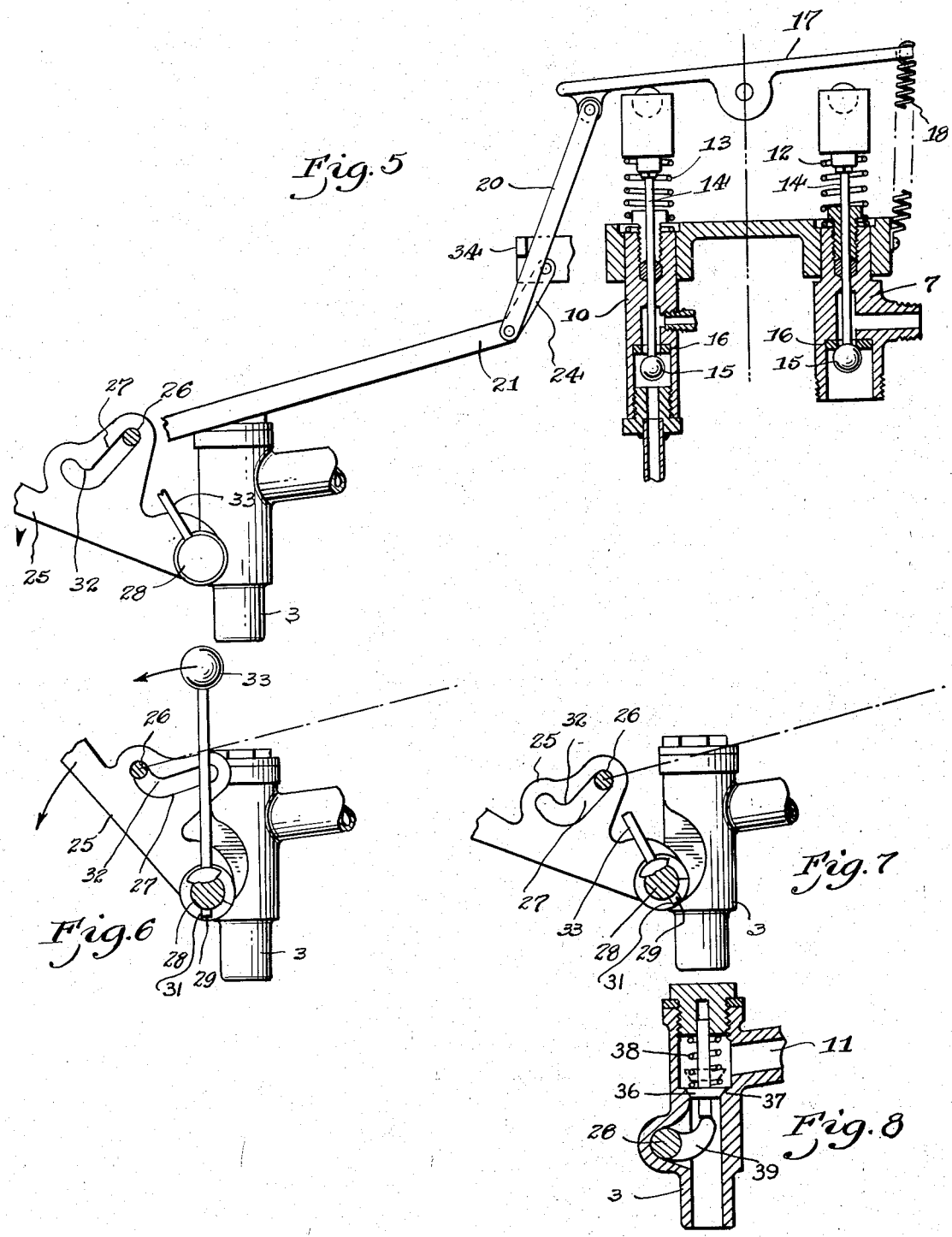

UNITED STATES PATENT OFFICE 2,319,308

APPARATUS FOR DISPENSING CARBONATED BEVERAGES

Russell H. Ellison, Dearborn, Mich., assignor, by mesne assignments, to Violet K. Ellison, Dearborn, Mich.

Application May 23, 1940, Serial No. 336,735

7 Claims. (Cl. 225—9)

My invention relates to an improved method and apparatus for dispensing carbonated beverages.

An object of this invention is to provide a means of serving a carbonated beverage with a minimum loss of the gas content of the beverage.

A further object is to provide a system adapted to maintain beverages under full pressure and adapted to momentarily remove all gas pressure from a limited amount of said beverage during the dispensing period.

A further object is to provide a means of serving a carbonated beverage with a minimum amount of foam in the serving container.

A further object is to provide a device which will permit control of the amount of foam on beverages served by draught.

Another object is to provide a time-saving device which will eliminate the loss of time in "skimming" foam from a beverage served by draught.

A further object is to provide a device adapted to supply a beverage to a dispensing outlet by means of gravity only regardless of the pressure maintained in the supply container.

A further object is to provide a device which will accomplish the aforementioned objects and is operated by a single control handle.

Other objects and advantages of my invention will be apparent in the following description.

It is well known that carbonated beverages must be maintained under pressure to retain the gas pressure therein. However, heretofore on serving from a supply maintained under pressure, this pressure has subjected the beverage to violent movement when dispensed. Such violent physical action causes foaming and loss of the gas content of the beverage, as is well known. In the present invention means are provided to permit a gentle dispensing of the beverage. The beverage is carried to the faucet by gravity alone and is not subject to the pressure on the keg or other container.

In the drawings:

Figs. 3, 4 and 5 are diagrammatic views showing various positions of the valves and handle.

Fig. 6 is a detail view showing the control handle ready to open the faucet.

Fig. 7 shows the position of the control handle after it has opened the faucet.

Fig. 8 is a vertical cross section of the faucet.

Figure 1:
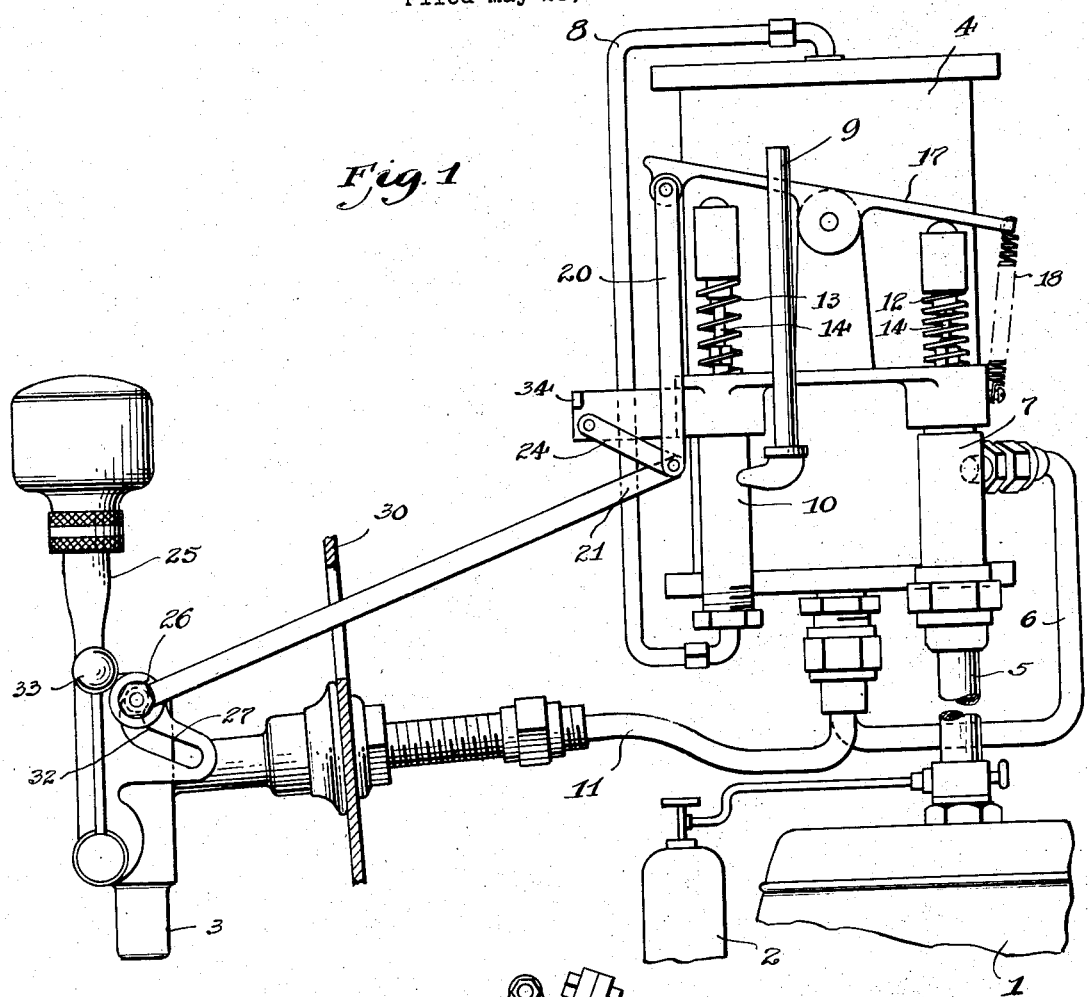
Fig. 1 is a side elevation of the device with the control handle in off position and the supply container and pressure source shown.
Figure 2:
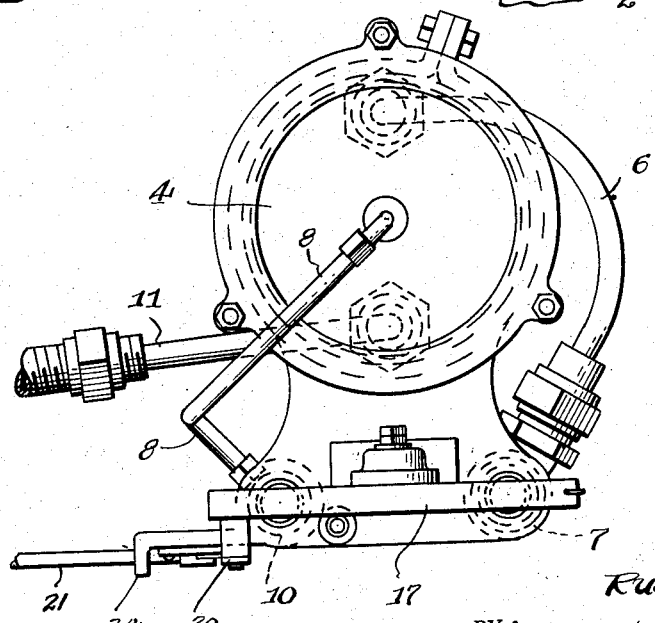
Fig. 2 is a top plan view of a portion of the device.

Referring to Fig. 1, the numeral 1 designates a suitable container for a supply of the beverage to be served. A source of pressure for this container or keg is shown by drum 2. A dispensing faucet is shown at 3. Intermediate this supply container and faucet is a separate dispensing container 4 of a relatively small capacity, disposed at a higher elevation than faucet 3. The usual vertical wall of the cabinet or bar is shown at 30. The beverage may be cooled by any suitable means.

Beverage may be fed from the supply container to the dispensing container by tubes 5 and 6. A valve 7 controls this line of supply. Tubes 8 and 9 vent the dispensing container 4 to the atmosphere. A valve 10 controls this vent to the atmosphere. When valve 10 to the atmosphere is closed and valve 7 to the supply container is open, as in Figs. 1 and 3, the dispensing container 4 will be substantially filled with the beverage and be under pressure from source 2. This is the idle or off position of the device. The beverage is forced by pressure from drum 2 to enter the dispensing container until the pressure of compressed air above the liquid equals the pressure in drum 2. To serve some beverage, valve 7 is closed and valve 10 opened as in Fig. 5. Pressure drum 2 is now cut off from the dispensing chamber and the dispensing chamber is vented to the atmosphere through valve 10. Dispensing faucet 3 may be opened and the beverage in container 4 will flow by gravity through tube 11 and out faucet 3. Gentle emission of the beverage by gravity through faucet 3 will cause but a minimum amount of foam and loss of gas content of the beverage. Air may enter the dispensing container through tubes 9 and 8 while the beverage is being discharged through line 11 and faucet 3. Dispensing container 4 should be included in the cooling system and to this end valves 7 and 10 are preferably designed to operate under cooling water if desired.

It should be noted that this system permits the beverage to be maintained under full pressure at substantially all times. The pressure is released only from a limited amount of the beverage and only for a short interval of time as an incident of dispensing the beverage. Therefore, the beverage is not allowed to lose its charge from standing under low pressure. In addition, it should be noted that valve 10 is never open when valve 7 is open. This prevents beverage from creating foam as it enters the dispensing container 4.

Means to control the operation of the valves 7 and 10 and faucet 3 to effect the desired result will now be described. As shown in Figs. 1, 3, 4 and 5, the valves 7 and 10 are vertically disposed adjacent each other. They are urged upward to their normally closed position by springs 12 and 13, respectively. In the form illustrated, these valves comprise a vertical rod 14 with a ball 15 on the end thereof. A valve seat 16 is disposed above the ball. A rocker arm 17, suitably pivoted on the dispensing container or an attachment thereto, constitutes the means for opening these valves. This rocker arm is adapted to contact the tops of rods 14 and alternately urge the valves open. Spring 18 normally urges the rocker arm to assume the position shown in Figs. 1 and 3 wherein valve 7 to the supply container is open and valve 10 to the atmosphere is closed. Suitable linkage such as links 20 and 21 connects the free end of rocker arm 17 to the control handle 25. Referring to Figs. 1 and 3, it will be seen that counterclockwise rotation of the control handle 25 will rotate the rocker arm 17 in counterclockwise direction, thereby closing valve 7 and opening valve 10, as shown in Fig. 5. When control handle 25 is returned to "off" position, spring 18 returns rocker arm 17 to the position shown in Figs. 1 and 3. Fig. 4 illustrates a form wherein valve 7 may be closed slightly before valve 10 is opened.

As previously explained, the filling of the dispensing container, closing valve 7 to the supply container, and venting the dispensing container to the atmosphere through valve 7 should all occur before the faucet 3 is opened to permit a gravity flow of the beverage to the serving container. A construction adapted to accomplish this result will now be described. A cross section of a common type of dispensing faucet 3 is shown in Fig. 8 wherein a poppet valve 36 is adapted to fit on valve seat 37 and coil spring 38 urges the valve to closed position. A rotatable member 28 is provided with a laterally projecting finger 39 adapted to raise valve 36 when member 28 is rotated in a counterclockwise direction as illustrated. Heretofore, however, control handle 25 has been rigidly fastened to rotatable member 28. In the device described herein, a pin 29 is provided on rotatable member 28 and a shoulder 31 is provided in handle 25. This pin and shoulder are adapted to permit a delayed rotation of member 28. Link 21 is provided with a roller 26 adapted to engage a cam slot 27 provided in handle 25. In the interval of time before the delayed rotation of valve member 28, the rotation of handle 25 will cause roller 26 and cam slot 27 to actuate the rocker arm 17 and valving arrangement. Thereby valve 7 is closed and valve 10 is opened before the faucet 3 is opened. An "over-center" linkage arrangement, to be hereinafter described, will prevent rocker arm 17 from returning to its original position until the handle 25 is shut off. This will therefore, maintain valve 7 closed and valve 10 open, while faucet 3 is open. Cam 27 and shoulder 31 are preferably so designed that when roller 26 passes the sharp angle 32 in the cam slot and the tension on line 21 is released, then shoulder 31 engages pin 29 and actuates the faucet.

The arrangement of linkage is important. Links 20 and 21 furnish the means for transmitting force from handle 25 to rocker arm 17. The combination of an additional link 24 and a stop 34 provide an "over-center" position shown in Fig. 5 whereby spring 18 cannot alone return rocker arm 17 to its Fig. 1 position. The only way it may be returned is by returning handle 25 to "off" position. Link 24 is shown as pivotally fastened to links 20 and 21 and to a stationary extension of dispensing container 4.

In my preferred construction, handle 25 may rotate counterclockwise free of rotatable member 28 for substantially 45° before shoulder 31 engages pin 29 and actuates the faucet. At this time the position of cam 27 changes to free link 21 while handle 25 is operating the faucet by further counterclockwise rotation. This 45° movement permits the operation of the unit through the action of cam 27 and link 21 before the beverage flows from the faucet.

The return of handle 25 to "off" position shown in Figs. 1 and 3, closes faucet 3, returns roller 26 to the top of cam slot 27, and releases the "over-center" linkage arrangement of link 24 and stop 34.

A small handle 33 may be attached to the rotatable member 28 of faucet 3 to permit counterclockwise rotation of member 28 directly without the use of handle 25. It has previously been explained that when the device is at rest, valve 7 is open and valve 10 closed. Obviously, then rotation of member 28 will open the faucet while valve 7 to the pressure source is open. This permits the beverage to be forced out of faucet 3 by the pressure from supply 2, as is the common practice today. This will cause a foaming beverage to be served. This optional use of my invention makes the amount of foam to be served within the control of the operator.

In the operation of my device, it should be noted that when it is off or at rest, the dispensing container 4 is maintained substantially full of beverage under pressure from source 2. This occurs because spring 18 urges rocker arm 17 to maintain valve 7 open and permit valve 10 to close. To serve some beverage, handle 25 is rotated counterclockwise (Fig. 1) to open position (Fig. 5). By means of cam 27 and roller 26, this motion is transmitted as a pull on link 21. By means of the linkage described, a pull on lever 21 rotates rocker arm 17 and permits valve 7 to the pressure source to close and opens valve 10, venting container 4 to the atmosphere when handle 25 is in Fig. 6 position. Further rotation of handle 25 to the Figs. 5 and 7 position causes roller 26 to pass the angle in the cam slot and release the pull on link 21. The "over-center" linkage of link 24 prevents rocker arm 17 from returning to its Fig. 1 position. The vent on container 4, therefore, remains open and the container 4 is sealed from the pressure source. Substantially at the time roller 26 releases the force on link 21, shoulder 31 on the handle 25 picks up pin 29 and opens the faucet allowing the discharge of beverage. Handle 25 is manually returned to its initial position and faucet 3 thereby closed, roller 26 will move to the top of cam slot 27 and rocker arm 17 will open valve 7 and permit valve 10 to close. This procedure may now be repeated or handle 33 may be pulled by the operator. When handle 33 is pulled the faucet is opened while valve 7 is open and valve 10 closed. Beverage is forced out of faucet 3 by pressure from source 2 and a foaming beverage is served. The operator therefore has a choice of serving a foaming or not foaming beverage.

I claim:

1. A device for dispensing a gas charged beverage comprising a dispensing container, gas pressure means to supply beverage to said container, a valve adapted to stop said means, a vent from said container to the atmosphere, a valve adapted to substantially seal said vent, means normally to urge said first mentioned valve to open position, means normally to urge said second mentioned valve to closed position, a faucet operatively connected to said dispensing container, lever means adapted to close said first mentioned valve and open said second mentioned valve, a handle adapted to operate said faucet and cam means on said handle adapted to operate said lever means.

2. A device for dispensing carbonated beverages comprising a supply source maintained under pressure, means for momentarily removing all gas pressure from a limited amount of said beverage, a faucet adapted to permit dispensing of said beverage by gravity, a handle on said faucet adapted to control said means and operate said faucet and an auxiliary handle adapted to operate said faucet without actuating said means.

3. A device for dispensing a gas charged beverage comprising a dispensing container, gas pressure means to supply beverage to said container, a valve adapted to interrupt said means, a vent from said container to the atmosphere, a valve adapted to close said vent, said valve being disposed substantially adjacent to said first mentioned valve, a lever pivotally mounted between said valves and adapted to alternately open them, spring means on said valves normally urging them closed, spring means on said lever normally urging it to a position whereby the said first mentioned valve is open and the second mentioned valve closed, a faucet, a handle on said faucet said handle being provided with a cam slot, a plurality of links connecting said faucet and said lever, one of said links being provided with a portion adapted to engage the said cam slot and the said cam slot and links being adapted to transmit force from the rotation of the said handle to pivot the said lever to a position whereby the first mentioned valve is closed and the second mentioned valve is open, an over-center link pivoted on one end to said links and pivotally mounted at its other end on a stationary object, said over center link being adapted to maintain the said lever in its latter position until the said handle is returned to initial position, and means to open said faucet while said lever is maintained in its said latter position.

4. A device for dispensing carbonated beverages comprising a supply source maintained under pressure, a first means for momentarily removing gas pressure from a limited amount of said beverage, a faucet, a handle pivoted on said faucet, said handle being provided with a cam slot, linkage retained in said cam slot and operatively connected to said first means, said cam slot having a first portion substantially radial of said handle and adapted to actuate said linkage during initial movement of said handle and a second portion approximating an arc having the pivotal mounting of the handle as a center to release the linkage from operative connection with the handle upon further movement of the handle, a second means to retain said first means in operative position until the handle is returned to initial position, said handle being adapted to actuate said faucet during the latter part of its movement when the linkage is not operatively connected to the handle.

5. A device for dispensing carbonated beverages comprising a supply source maintained under pressure, a first means for momentarily removing all gas pressure from a limited amount of said beverage, a valve body to dispense said beverage by gravity, a valve member in said valve body, a handle pivotally mounted on said valve body, a lost motion connection between said handle and said valve member whereby the valve member is only actuated to open position after considerable motion of the handle, a second means operatively connected to said handle and adapted to utilize the lost motion of said handle to actuate said first means, and an auxiliary handle adapted to operate said valve member without actuating said first mentioned means.

6. A device for dispensing a gas charged beverage comprising a dispensing container, gas pressure means to supply beverage to said container, a valve adapted to interrupt said means, a vent from said container to the atmosphere, a valve adapted to close said vent, means normally to urge said second mentioned valve to closed position, a faucet operatively connected to said dispensing container, a handle on said faucet, said handle being provided with a cam slot, lever means adapted normally to close said first mentioned valve and open said second mentioned valve, said lever means being provided with a portion adapted to engage said cam slot and the said cam slot and lever means being adapted to transmit force from the rotation of the said handle to close said first mentioned valve and open said second mentioned valve, an over-center link connected on one end to said lever means and pivotally mounted at its other end on a stationary object, said over-center link being adapted to maintain the said valves in their latter position until the handle is returned to initial position, and means to open said faucet while said valves are maintained in their latter position.

7. A device for dispensing carbonated beverages comprising a dispensing container, gas pressure means to supply beverage to said container, a valve adapted to stop said means, a vent from said container to the atmosphere, a valve adapted to substantially seal said vent, said valves being positioned adjacent each other, spring means in said valves to urge said valves to closed position, lever means fulcrumed between said valves and adapted to alternately actuate said valves to open position, spring means adapted to hold said lever normally in position to maintain said first mentioned valve in open position, a faucet operatively connected to said dispensing container, a handle on said faucet, means connecting said handle and said lever, means to utilize the rotation of said handle to pivot said lever about its fulcrum and permit said first mentioned valve to close and to open said second mentioned valve prior to the operation of said faucet.

RUSSELL H. ELLISON.